(12) United States Patent
Kuroda et al.

(10) Patent No.: US 8,085,468 B2
(45) Date of Patent: Dec. 27, 2011

(54) LINE GENERATOR

(75) Inventors: Takamasa Kuroda, Osaka (JP);
Yousuke Nakano, Osaka (JP);
Kazuyuki Yao, Osaka (JP)

(73) Assignee: Nalux Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 12/830,545

(22) Filed: Jul. 6, 2010

(65) Prior Publication Data
US 2011/0002042 A1    Jan. 6, 2011

Related U.S. Application Data

(63) Continuation-in-part of application No. PCT/JP2009/004563, filed on Sep. 14, 2009.

(60) Provisional application No. 61/181,822, filed on May 28, 2009.

(51) Int. Cl.
*G02B 27/10* (2006.01)
*G02B 27/30* (2006.01)
*G02B 9/04* (2006.01)

(52) U.S. Cl. .................... 359/618; 359/641; 359/793

(58) Field of Classification Search ............ 359/641, 359/618, 642, 793; 362/553
See application file for complete search history.

(56) References Cited

U.S. PATENT DOCUMENTS

| 5,095,386 A | 3/1992 | Scheibengraber |
| 6,069,748 A | 5/2000 | Bietry |
| 2006/0176912 A1 | 8/2006 | Anikitchev |

FOREIGN PATENT DOCUMENTS

| JP | 2008-058295 | 3/2008 |
| WO | 2007048506 A1 | 5/2007 |

OTHER PUBLICATIONS

European Search Report application No. 10163168.7 dated Nov. 2, 2010.

*Primary Examiner* — Jack Dinh
(74) *Attorney, Agent, or Firm* — Squire, Sanders & Dempsey (US) LLP

(57) ABSTRACT

A line generator according to the present invention includes a light source, a first lens group, and a second lens group. An optical axis is set to a position of a light beam which travels orthogonal to incidence surfaces of both the first and second lens groups and the first lens group is configured such that light beams from the light source are not collimated in a first direction in a plane orthogonal to the optical axis and are collimated or focused only in a second direction orthogonal to the first direction in the plane orthogonal to the optical axis and the second lens group is configured such that the light beams which have passed through the first group form a line.

7 Claims, 19 Drawing Sheets

APPROXIMATELY 13mm

3mm

APPROXIMATELY 20mm

US 8,085,468 B2

LINE GENERATOR

CROSS-REFERENCE RELATED APPLICATION

This is a Continuation-in-Part (CIP) application of International Application No. PCT/JP2009/004563, filed Sep. 14, 2009, which claims priority of U.S. Provisional Patent Application No. 61/181,822 filed May 28, 2009. The disclosure of the prior application is hereby incorporated by reference herein in its entirety.

FIELD OF THE INVENTION

The present invention relates to a line generator using a light source such as a laser diode.

BACKGROUND ART

On building and construction sites and in factories, line generators using light sources such as laser diodes, light emitting diodes, and optical fibers are used for setting fiducial lines for positioning, step height measurement and detection of defects.

FIG. 27 and FIG. 28 illustrate an example of configurations of conventional line generators. The line generator includes a laser diode light source 1101, a collimating lens having rotation symmetry 1103 and a rod lens 1105. FIG. 27 shows a cross sectional view in the vertical direction (fast-axis (FA) direction) of the laser diode light source 1101 while FIG. 28 shows a cross sectional view in the horizontal direction (slow-axis (SA) direction) of the laser diode light source 1101. In FIG. 28, light emitted by the laser diode light source 1101 is collimated by the collimating lens having rotation symmetry 1103 in the SA direction to generate a light beam having a width of 3 millimeters. The width of the light beam after the collimation is that of the line generated by the line generator. On the other hand, as shown in FIG. 27, the light emitted by the laser diode light source 1101 is collimated by the collimating lens having rotation symmetry 1103 in the FA direction to generate a light beam having a width of approximately 6 millimeters. After being collimated by the collimating lens having rotation symmetry 1103, the light is diverged in the FA direction by the rod lens 1105 to generate the line.

Since the size of the collimating lens 1103 is limited, only a part of the light which has become approximately 10 millimeter wide in the FA direction is utilized. As a result, maximum light utilizing efficiency is approximately 60%. Further, although a wide diverging angle can be easily obtained, brightness along the line cannot be controlled.

FIG. 29 and FIG. 30 illustrate another example of configurations of conventional line generators. The line generator includes a laser diode light source 1201, a collimating lens having rotation symmetry 1203 and a cylindrical lens 1205. FIG. 29 shows a cross sectional view in the vertical direction (fast-axis (FA) direction) of the laser diode light source 1201 while FIG. 30 shows a cross sectional view in the horizontal direction (slow-axis (SA) direction) of the laser diode light source 1201. In FIG. 30, light emitted by the laser diode light source 1201 is collimated by the collimating lens having rotation symmetry 1203 in the SA direction to generate a light beam having a width of 3 millimeters. The width of the light beam after the collimation is that of the line generated by the line generator. On the other hand, as shown in FIG. 29, the light emitted by the laser diode light source 1201 is collimated by the collimating lens having rotation symmetry 1203 in the FA direction to generate a light beam having a width of approximately 6 millimeters. After being collimated by the collimating lens having rotation symmetry 1203, the light is diverged in the FA direction by the cylindrical lens 1205 to generate the line.

Since the size of the collimating lens 1203 is limited, only a part of the light which has become approximately 10 millimeter wide in the FA direction is used. As a result, maximum light utilizing efficiency is approximately 60%. Brightness along the line can be arbitrarily controlled by adjusting a shape of the optical surface of the cylindrical lens 1205. However, due to restriction in manufacturing a mold used for molding the lens, a tangential angle of the cylindrical shape can hardly be enlarged, and therefore a wide diverging angle can hardly be obtained. Further, the light beam is designed to be focused at a position of a certain distance such that brightness along the line is made uniform. Accordingly, when the collimating lens 1203 is adjusted for focusing, brightness along the line will deviate from the designed value.

Japanese patent application laid open No. 2008-58295 discloses one of conventional line generators. U.S. Pat. No. 6,069,748 discloses another one of line generators.

Thus, a line generator having high light utilizing efficiency in which a wide diverging angle is obtained and brightness along the line can be easily controlled has not been developed.

So, there is a need for a line generator having high light utilizing efficiency in which a wide diverging angle is obtained and brightness along the line can be easily controlled.

SUMMARY OF THE INVENTION

A line generator according to the present invention includes a light source, a first lens group, and a second lens group. An optical axis is set to a path of a light beam which travels orthogonal to incidence surfaces of both the first and second lens groups and the first lens group is configured such that light beams from the light source are not collimated in a first direction in a plane orthogonal to the optical axis and are collimated or focused only in a second direction orthogonal to the first direction in the plane orthogonal to the optical axis and the second lens group is configured such that the light beams which have passed through the first group form a line.

In the text of specification and in claims a lens group means one or plural lenses which has a predetermined function as the whole.

In the line generator according to the present invention, function of the first lens group and that of the second lens group are clearly separated from each other. Accordingly, a width of the line can be determined by adjusting shapes of optical surfaces of the first lens group while brightness distribution along the line can be arbitrarily adjusted by adjusting shapes of optical surfaces of the second lens group. Further, light is collimated or focused only in one direction (a direction of width of the line) by the first lens group, and therefore a wide diverging angle can be obtained by the second group lens. Further, most portion of the light which has traveled thorough the first group lens enters the second group lens, and therefore light utilizing efficiency becomes higher.

In a line generator according to an embodiment of the present invention, at least one of the first lens group and the second lens group is provided with a mechanism for adjustment of position along the optical axis.

According to the embodiment, the focal position of the line can be easily adjusted while brightness distribution along the line is kept unchanged, by adjusting a position of the first lens group along the optical axis. Further, when one of the laser diode light sources light emitting conditions of which varies from one to another is used as the laser diode light source, brightness distribution along the line can be kept constant while the focal position is maintained by adjusting a position of the second lens along the optical axis.

In a line generator according to an embodiment of the present invention, the light source is a laser diode and the first direction is set to the vertical direction (first-axis direction) of the laser diode and the second direction is set to the horizontal direction (slow-axis direction) of the laser diode.

In the present embodiment, the FA direction is set to width direction of the line, and therefore a more compact line generator can be obtained.

In a line generator according to an embodiment of the present invention, the light source is a laser diode and the second direction is set to the vertical direction (first-axis direction) of the laser diode and the first direction is set to the horizontal direction (slow-axis direction) of the laser diode.

In the present embodiment, the SA direction is set to width direction of the line, and therefore a wider diverging angle can be obtained.

In a line generator according to an embodiment of the present invention, at least one surface of the first and second lens groups is a free form surface which is symmetric with respect to the first direction and the second direction and a focal length in the first direction around the center differs from a focal length in the first direction at the periphery.

In the present embodiment, by the use of a free form surface in at least one surface, collimating performance can be improved. More specifically, light can be focused in a narrower line or light can be focused on any surface as a line.

A line generator according to an embodiment of the present invention is further provided with a phase plate having at least one free form surface.

According to the present embodiment, an optical element including a free form surface that is difficult to produce can be produced independently of lenses and therefore the producing process is simplified.

DETAILED DESCRIPTION

Examples of the present invention will be described below. In the text of specification the phrase "to collimate" also means "to focus light at a distant point". Materials of lenses can be selected according to applications. Plastics are resistant to breaking and can be molded into complicated shapes at low costs. Glasses have coefficients of thermal expansion smaller than those of plastics and more heat-resistant than plastics, and therefore less insensitive to changes in surrounding environments and more reliable than plastics.

Example 1

Figure 1:
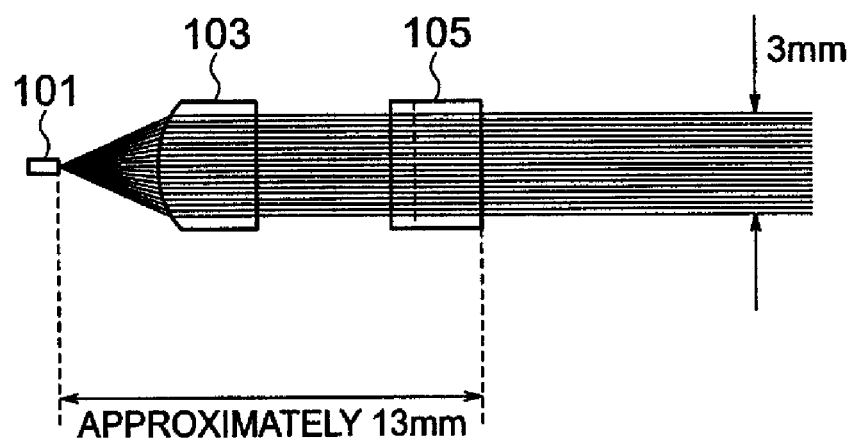
FIG. 1 illustrates a configuration of a line generator according to Example 1 of the present invention.
Figure 2:
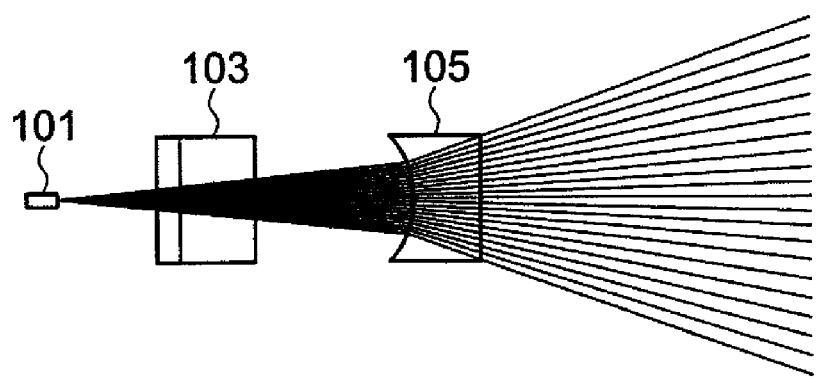
FIG. 2 illustrates a configuration of the line generator according to Example 1 of the present invention.

FIGS. 1 and 2 illustrate the configuration of a line generator according to Example 1 of the present invention. The line generator includes a laser diode light source 101, a first lens 103 which is a cylindrical lens and a second lens 105 which is a cylindrical lens. FIG. 1 shows a cross sectional view in the vertical direction (fast-axis (FA) direction) of the laser diode light source 101 while FIG. 2 shows a cross sectional view in the horizontal direction (slow-axis (SA) direction) of the laser diode light source 101. In FIG. 1, light emitted by the laser diode light source 101 is collimated by the first lens 103 in the FA direction to generate a light beam having a width of 3 millimeters. The width of the light beam after the collimation is that of the line generated by the line generator. Since the first lens 103 is a cylindrical one, the light is not collimated in the SA direction. The light collimated in the FA direction by the first lens 103 is diverged in the SA direction by the second lens 105 to generate the line.

In the SA direction the light is not collimated by the first lens 103 and the diverged light is further diverged by the second lens 105. In other words, the light is not collimated in the SA direction in the present example. Accordingly, a diverging angle wider than those of conventional type line generators can be obtained. Further, most portion of the light which has traveled thorough the first lens 103 enters the second lens 105, and therefore light utilizing efficiency is 90% or more.

By adjusting shapes of the optical surfaces of the second lens 105, brightness along the line can be made uniform or brightness at any portion can be increased.

In the present example, the first lens 103 is used to determine a width of the line while the second lens 105 is used to generate the line which has a desired brightness distribution along it. Thus, function of the first lens 103 and that of the second lens 105 are clearly separated from each other.

The configuration in which the FA direction is set to the direction of the width of the line has the following advantage. The diverging angle in the FA direction is larger than that in the SA direction, and therefore a sufficient width of the line can be obtained with a short optical path length. This allows downsizing of the optical system.

Table 1 shows data of the optical system of the line generator according to Example 1. The value entered at the cross point of the row labeled "light source" and the column labeled "surface interval" indicates an interval between the light source and the first lens. The value entered at the cross point of the row labeled "2" and the column labeled "surface interval" indicates a thickness of the first lens. The value entered at the cross point of the row labeled "3" and the column labeled "surface interval" indicates an interval between the first lens and the second lens. The value entered at the cross point of the row labeled "4" and the column labeled "surface interval" indicates a thickness of the second lens. Unit of length in Table 1 and the tables described below is millimeter.

TABLE 1

| Surface No. | | Surface interval | Refractive index | Abbe constant |
|---|---|---|---|---|
| | Light source | 3.0 | | |
| 2 | First lens (Cylindrical surface) | 3.0 | 1.60606 | 54.88 |
| 3 | First lens (Plane) | 3.8 | | |
| 4 | Second lens (Cylindrical surface) | 2.0 | 1.60606 | 54.88 |
| 5 | Second lens (Plane) | | | |

Assuming that the FA direction is the direction of x-axis and the SA direction is the direction of y-axis, the optical surfaces of the first lens (the second surface on the object side and the third surface on the image side) are represented by the following expressions.

$$z = \frac{cx^2}{1 + \sqrt{1 - (1+k)c^2 x^2}} + \sum_{i=2}^{n} \alpha_{2i} x^{2i} \quad (1)$$

$$c = 1/R \quad (2)$$

k represents a constant for determining a shape of the quadratic curve, c represents a curvature at the center, and R represents a radius of curvature at the center. $\alpha_{2i}$ represents correcting coefficients.

Table 2 shows coefficients or constants in the expressions representing the second and third surfaces.

TABLE 2

| | Second surface | Third surface |
|---|---|---|
| R | 1.820144 | infinity |
| k | −2.571631 | 0 |
| $\alpha_4$ | $5.85685 \times 10^{-6}$ | 0 |
| $\alpha_6$ | $2.113507 \times 10^{-7}$ | 0 |

Assuming that the FA direction is the direction of x-axis and the SA direction is the direction of y-axis, the optical surfaces of the second lens (the fourth surface on the object side and the fifth surface on the image side) are represented by the following expressions.

$$z = \sum_{i=1}^{n} \alpha_{2i} y^{2i} \quad (3)$$

$\alpha_{2i}$ represents correcting coefficients.

Table 3 shows coefficients or constants in the expressions representing the fourth and fifth surfaces.

TABLE 3

| | Fourth surface | Fifth surface |
|---|---|---|
| $\alpha_2$ | −0.844902 | 0 |
| $\alpha_4$ | 0.359297 | 0 |
| $\alpha_6$ | −0.099127 | 0 |
| $\alpha_8$ | −0.012041 | 0 |
| $\alpha_{10}$ | 0.021224 | 0 |
| $\alpha_{12}$ | $-5.281427 \times 10^{-3}$ | 0 |

Figure 3:
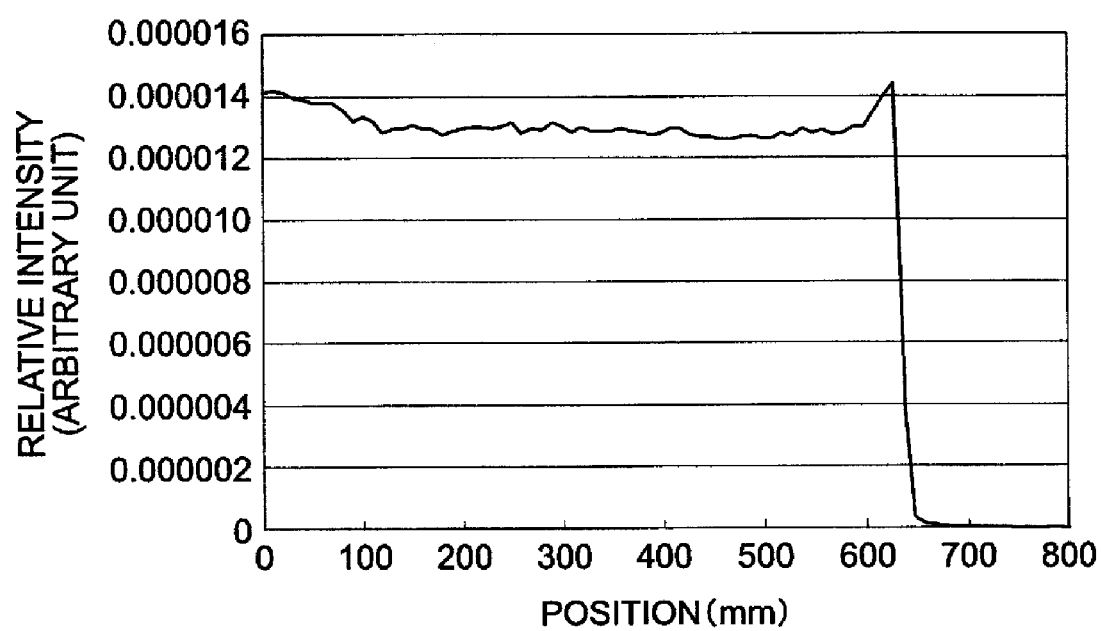
FIG. 3 illustrates performance of the line generator according to Example 1 of the present invention.

FIG. 3 illustrates performance of the line generator according to Example 1. The horizontal axis of FIG. 3 represents distance between an arbitrary point on the line and the point of the intersection of the line and the optical axis. The vertical axis represents relative intensity of light at the arbitrary point. The illuminated surface is 1000 mm away from the light source and perpendicular to the optical axis. Brightness along the line on the illuminated surface is substantially uniform.

In order to make brightness along the line on the illuminated surface uniform, parameters of the fourth surface should be determined appropriately.

Example 2

Figure 4:
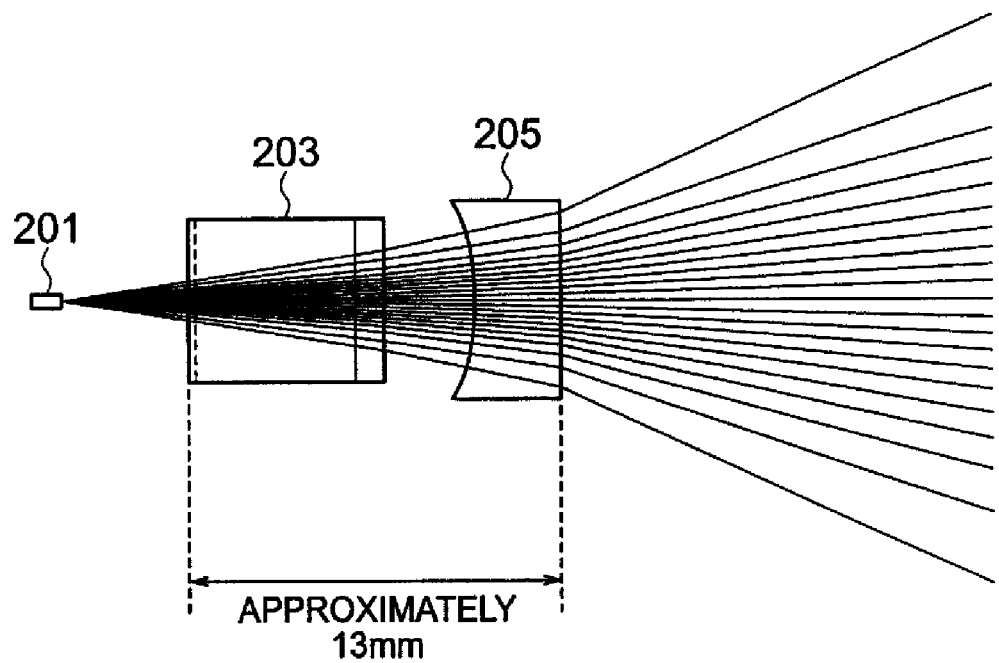
FIG. 4 illustrates a configuration of a line generator according to Example 2 of the present invention.
Figure 5:
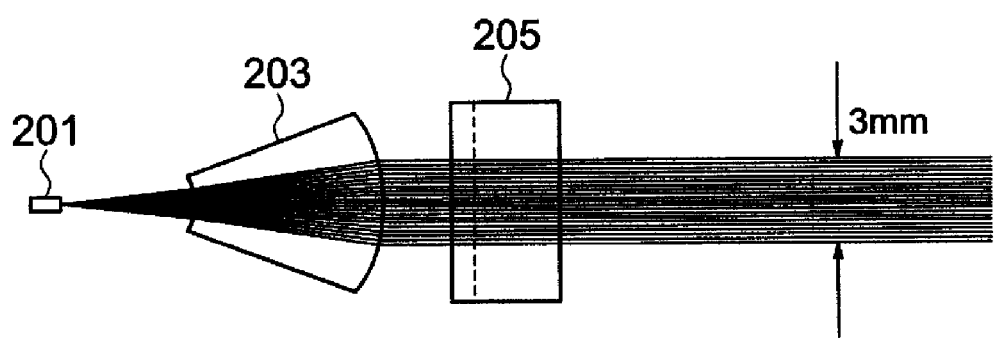
FIG. 5 illustrates a configuration of the line generator according to Example 2 of the present invention.

FIGS. 4 and 5 illustrate the configuration of a line generator according to Example 2 of the present invention. The line generator includes a laser diode light source 201, a first lens 203 which is a cylindrical lens and a second lens 205 which is a cylindrical lens. FIG. 4 shows a cross sectional view in the vertical direction (fast-axis (FA) direction) of the laser diode light source 201 while FIG. 5 shows a cross sectional view in the horizontal direction (slow-axis (SA) direction) of the laser diode light source 201. In FIG. 5, light emitted by the laser diode light source 201 is collimated by the first lens 203 in the SA direction to generate a light beam having a width of 3 millimeters. The width of the light beam after the collimation is that of the line generated by the line generator. Since the first lens 203 is a cylindrical one, the light is not collimated in the FA direction. The light collimated in the SA direction by the first lens 203 is diverged in the FA direction by the second lens 205 to generate the line.

In the FA direction the light is not collimated by the first lens 203 and the diverged light is further diverged by the second lens 205. In other words, the light is not collimated in the FA direction in the present example. Accordingly, a diverging angle wider than those of conventional type line generators can be obtained. Further, most portion of the light which has traveled thorough the first lens 203 enters the second lens 205, and therefore light utilizing efficiency is 80% or more.

By adjusting shapes of the optical surfaces of the second lens 205, brightness along the line can be made uniform or brightness at any portion can be increased.

In the present example, the first lens 203 is used to determine a width of the line while the second lens 205 is used to generate the line which has a desired brightness distribution along it. Thus, function of the first lens 203 and that of the second lens 205 are clearly separated from each other.

The configuration in which the SA direction is set to the direction of the width of the line has the following advantage. The diverging angle in the FA direction is larger, and therefore a wide diverging angle can be easily obtained.

Table 4 shows data of the optical system of the line generator according to Example 2.

TABLE 4

| Surface No. | | Surface interval | Refractive index | Abbe constant |
|---|---|---|---|---|
| | Light source | 3.0 | | |
| 2 | First lens (Cylindrical surface) | 4.3 | 2.09822 | 16.81 |
| 3 | First lens (Cylindrical surface) | 2.0 | | |
| 4 | Second lens (Cylindrical surface) | 1.5 | 2.09822 | 16.81 |
| 5 | Second lens (Plane) | | | |

Assuming that the FA direction is the direction of x-axis and the SA direction is the direction of y-axis, the optical surfaces of the first lens (the second surface on the object side and the third surface on the image side) are represented by the following expressions.

$$z = \frac{cy^2}{1 + \sqrt{1 - (1+k)c^2 y^2}} + \sum_{i=2}^{n} \alpha_{2i} y^{2i} \quad (4)$$

$$c = 1/R \quad (2)$$

Table 5 shows coefficients or constants in the expressions representing the second and third surfaces.

TABLE 5

| | Second surface | Third surface |
|---|---|---|
| R | −1.15912 | −3.076346 |
| k | 0 | −2.169073 |
| $\alpha_4$ | 0 | −0.0074658746 |
| $\alpha_6$ | 0 | $-9.2201849 \times 10^{-5}$ |
| $\alpha_8$ | 0 | $-3.5989053 \times 10^{-5}$ |
| $\alpha_{10}$ | 0 | $1.3851247 \times 10^{-5}$ |
| $\alpha_{12}$ | 0 | $-1.1845873 \times 10^{-6}$ |

Assuming that the FA direction is the direction of x-axis and the SA direction is the direction of y-axis, the optical surfaces of the second lens (the fourth surface on the object side and the fifth surface on the image side) are represented by the following expressions.

$$z = \frac{cx^2}{1 + \sqrt{1 - (1+k)c^2 x^2}} + \sum_{i=2}^{n} \alpha_{2i} x^{2i} \quad (1)$$

$$c = 1/R \quad (2)$$

k represents a constant for determining a shape of the quadratic curve, c represents a curvature at the center, and R represents a radius of curvature at the center. $\alpha_{2i}$ represents correcting coefficients.

Table 6 shows coefficients or constants in the expressions representing the fourth and fifth surfaces.

TABLE 6

| | Fourth surface | Fifth surface |
|---|---|---|
| R | −3.47249 | infinity |
| k | −14.57677 | 0 |
| $\alpha_4$ | −0.029509 | 0 |
| $\alpha_6$ | 0.012712 | 0 |
| $\alpha_8$ | $-3.192851 \times 10^{-3}$ | 0 |
| $\alpha_{10}$ | $4.305014 \times 10^{-4}$ | 0 |
| $\alpha_{12}$ | $-2.556248 \times 10^{-5}$ | 0 |

Figure 6:
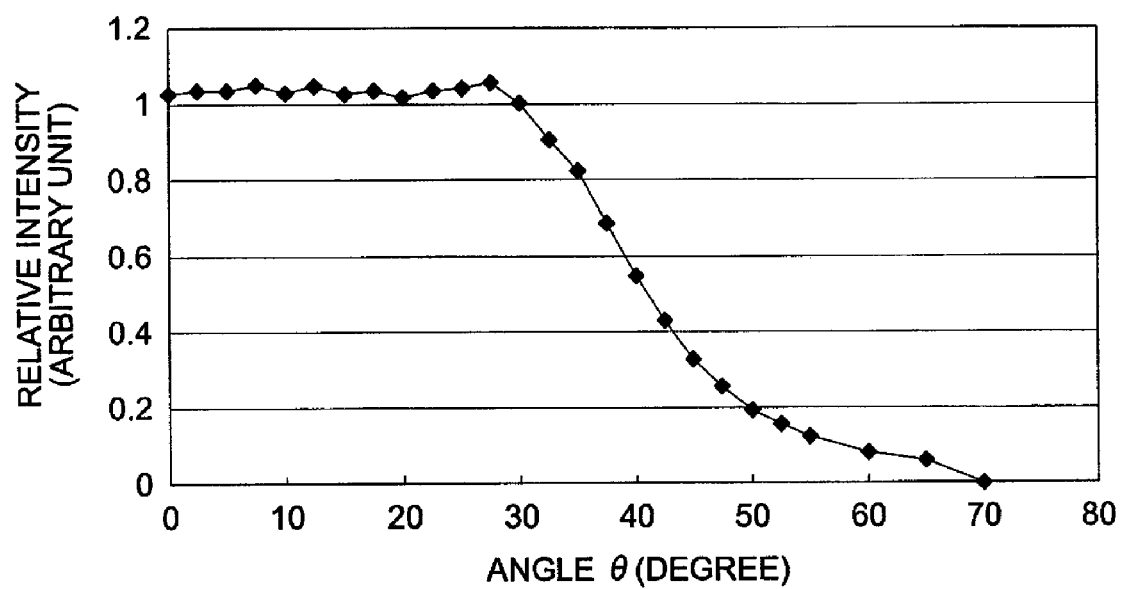
FIG. 6 illustrates performance of the line generator according to Example 2 of the present invention.

FIG. 6 illustrates performance of the line generator according to Example 2. The horizontal axis of FIG. 6 represents angle between the direction in which the light travels and the optical axis in the xz plane. The vertical axis of FIG. 6 represents relative intensity of the light corresponding to the angle. The relative intensity of the light is substantially uniform between 0 and 30 degrees.

In order to make brightness along the line uniform between 0 and 30 degrees, the parameters of the fourth surface should be determined appropriately.

Example 3

The configuration of a line generator according to Example 3 of the present invention is similar to that of Example 2 shown in FIGS. 4 and 5.

Table 7 shows data of the optical system of the line generator according to Example 3.

TABLE 7

| Surface No. | | Surface interval | Refractive index | Abbe constant |
|---|---|---|---|---|
| | Light source | 2.4 | | |
| 2 | First lens (Cylindrical surface) | 5.0 | 2.09822 | 16.81 |
| 3 | First lens (Free form surface) | 2.5 | | |
| 4 | Second lens (Cylindrical surface) | 1.5 | 1.80086 | 40.80 |
| 5 | Second lens (Plane) | | | |

Assuming that the FA direction is the direction of x-axis and the SA direction is the direction of y-axis, the second surface (the surface on the object side of the first lens) is represented by the following expression.

$$z = \frac{cy^2}{1 + \sqrt{1 - (1+k)c^2 y^2}} \quad (5)$$

$$c = 1/R \quad (2)$$

Table 8 shows coefficients or constants in the expressions representing the second surface.

TABLE 8

| | Second surface |
|---|---|
| R | −0.957 |
| k | 0 |

Assuming that the FA direction is the direction of x-axis and the SA direction is the direction of y-axis, the third surface (the surface on the image side of the first lens) is represented by the following expression. The third surface is a so-called free form surface. In the present example, the free form surface is determined such that it is symmetric with respect to x-axis and y-axis, the lens power in the direction along y-axis is larger than that in the direction along x-axis and lens power in the direction along y-axis around the center differs from that at the periphery.

$$z = \sum_{i,j=0}^{6} A_{ij} x^i y^j \quad (6)$$

Table 9 shows coefficients or constants in the expressions representing the third surface.

TABLE 9

| | Third surface |
|---|---|
| $A_{02}$ | −0.14924327 |
| $A_{22}$ | 0.0020178249 |
| $A_{04}$ | −0.0024808517 |
| $A_{42}$ | −3.5489418 × 10$^{-5}$ |
| $A_{24}$ | 0.00019047699 |
| $A_{06}$ | −0.00011399372 |

Assuming that the FA direction is the direction of x-axis and the SA direction is the direction of y-axis, the optical surfaces of the second lens (the fourth surface on the object side and the fifth surface on the image side) are represented by the following expressions.

$$z = \frac{cx^2}{1 + \sqrt{1-(1+k)c^2 x^2}} + \sum_{i=2}^{n} \alpha_{2i} x^{2i} \quad (1)$$

$$c = 1/R \quad (2)$$

k represents a constant for determining a shape of the quadratic curve, c represents a curvature at the center, and R represents a radius of curvature at the center. $\alpha_{2i}$ represents correcting coefficients.

Table 10 shows coefficients or constants in the expressions representing the fourth and fifth surfaces.

TABLE 10

| | Fourth surface | Fifth surface |
|---|---|---|
| R | −1.717522 | infinity |
| k | −1.768974 | 0 |

TABLE 10-continued

| | Fourth surface | Fifth surface |
|---|---|---|
| $\alpha_4$ | −0.018244111 | 0 |
| $\alpha_6$ | 0.0046760032 | 0 |
| $\alpha_8$ | −0.00041391394 | 0 |

Figure 7:
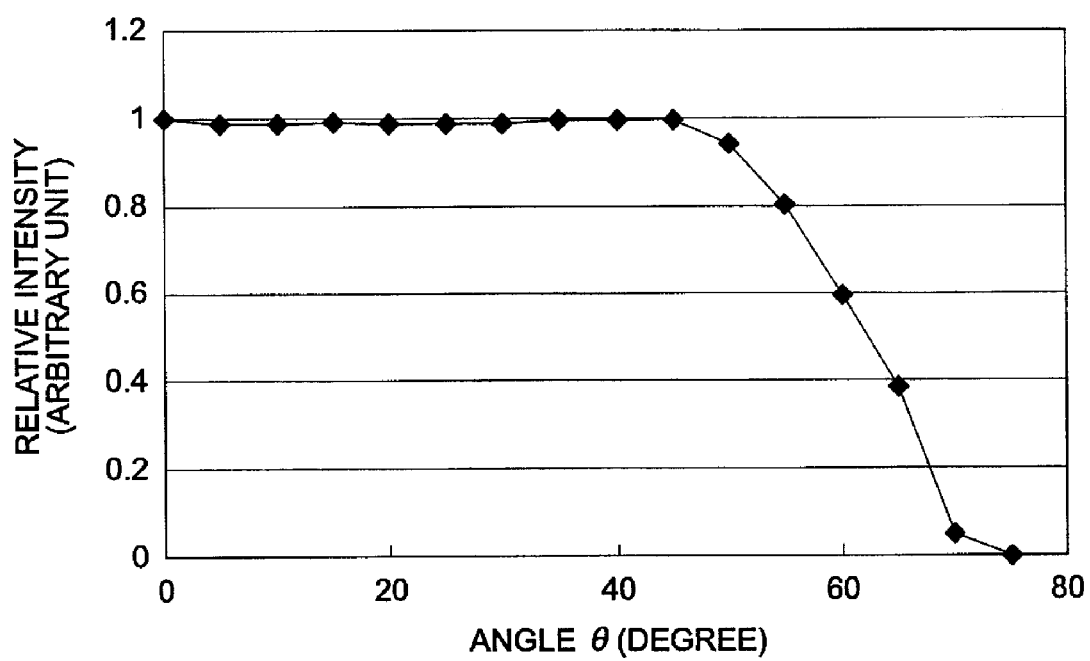
FIG. 7 illustrates performance of the line generator according to Example 3 of the present invention.

FIG. 7 illustrates performance of the line generator according to Example 3. The horizontal axis of FIG. 7 represents angle between the direction in which the light travels and the optical axis in xz plane. The vertical axis of FIG. 7 represents relative intensity of the light corresponding to the angle. The relative intensity of the light is substantially uniform between 0 and approximately 45 degrees.

In order to make brightness along the line uniform between 0 and approximately 45 degrees, the parameters of the fourth surface should be determined appropriately.

By the use of a free form surface as the third surface, collimating performance can be improved. More specifically, light can be focused in a narrower line or light can be focused on any surface as a line.

Example 4

Figure 8:
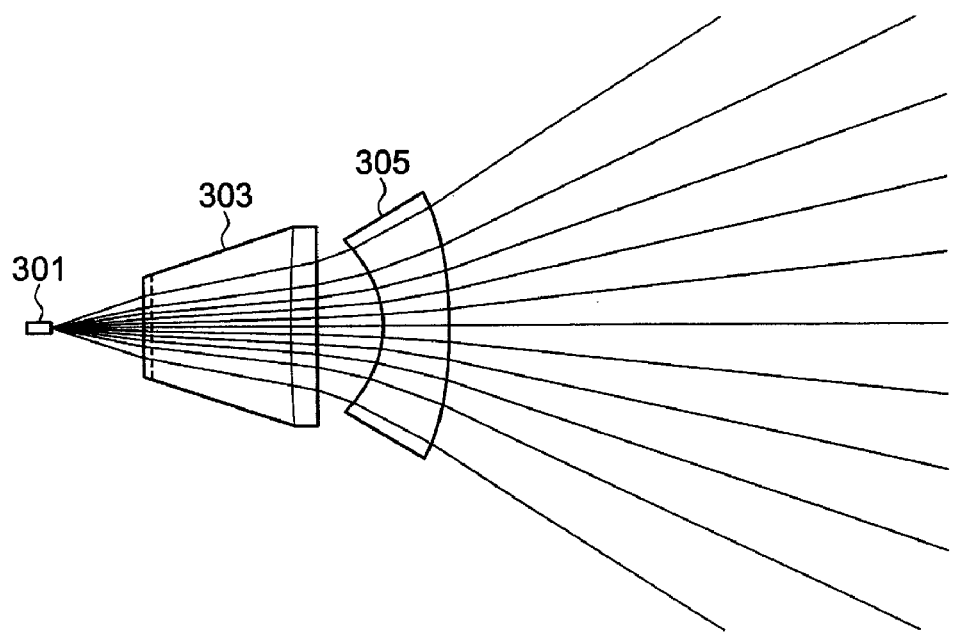
FIG. 8 illustrates a configuration of a line generator according to Example 4 of the present invention.
Figure 9:
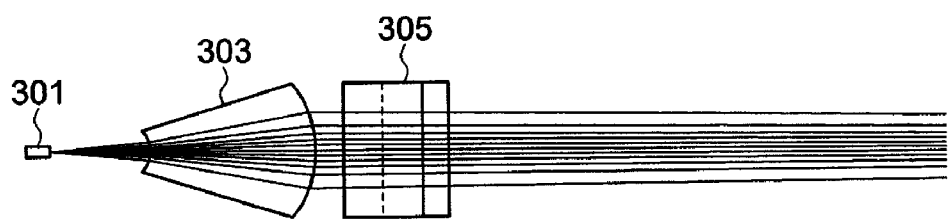
FIG. 9 illustrates a configuration of the line generator according to Example 4 of the present invention.

FIGS. 8 and 9 illustrate the configuration of a line generator according to Example 4 of the present invention. The line generator includes a laser diode light source 301, a first lens 303 which is a cylindrical lens and a second lens 305 which is a cylindrical lens. FIG. 8 shows a cross sectional view in the vertical direction (fast-axis (FA) direction) of the laser diode light source 301 while FIG. 9 shows a cross sectional view in the horizontal direction (slow-axis (SA) direction) of the laser diode light source 301. In FIG. 9, light emitted by the laser diode light source 301 is collimated by the first lens 303 in the SA direction to generate a light beam having a width of 3 millimeters. The width of the light beam after the collimation is that of the line generated by the line generator. Since the first lens 303 is a cylindrical one, the light is not collimated in the FA direction. The light collimated in the SA direction by the first lens 303 is diverged in the FA direction by the second lens 305 to generate the line.

Table 11 shows data of the optical system of the line generator according to Example 4.

TABLE 11

| Surface No. | | Refractive index | Abbe constant | Surface interval |
|---|---|---|---|---|
| | Light source | | | 3.0 |
| 2 | First lens (Cylindrical surface) | 1.80086 | 40.80 | 5.0 |
| 3 | First lens (Free form surface) | | | 3.0 |
| 4 | Second lens (Cylindrical surface) | 1.80086 | 40.80 | 2.0 |
| 5 | Second lens (Cylindrical surface) | | | 100 |

Assuming that the FA direction is the direction of x-axis and the SA direction is the direction of y-axis, the second surface (the surface on the object side of the first lens) is represented by the following expressions.

$$z = \frac{cy^2}{1 + \sqrt{1-(1+k)c^2 y^2}} \quad (5)$$

-continued $$c = 1/R \quad (2)$$

Table 12 shows coefficients or constants in the expressions representing the second surface.

TABLE 12

| | Second surface |
|---|---|
| R | −0.957 |
| k | 0 |

Assuming that the FA direction is the direction of x-axis and the SA direction is the direction of y-axis, the third surface (the surface on the image side of the first lens) is represented by the following expression. The third surface is a so-called free form surface. In the present example, the free form surface is determined such that it is symmetric with respect to x-axis and y-axis, the lens power in the direction along y-axis is larger than that in the direction along x-axis and lens power in the direction along y-axis around the center differs from that at the periphery.

$$z = \sum_{i,j=0}^{6} A_{ij} x^i y^j \quad (6)$$

Table 13 shows coefficients or constants in the expressions representing the third surface.

TABLE 13

| A02 | −0.17820329 |
| A22 | 0.0021122761 |
| A04 | −0.003687576 |
| A42 | −3.7905744 × 10⁻⁵ |
| A24 | 0.00018778603 |
| A06 | −0.0001530113 |
| A62 | 9.073778 × 10⁻⁷ |
| A44 | −1.2914223 × 10⁻⁵ |
| A26 | 2.627976 × 10⁻⁵ |
| A08 | −1.1001855 × 10⁻⁵ |

Assuming that the FA direction is the direction of x-axis and the SA direction is the direction of y-axis, the optical surfaces of the second lens (the fourth surface on the object side and the fifth surface on the image side) are represented by the following expressions.

$$z = \sum_{i=2}^{n} \alpha_{2i} x^{2i} \quad (7)$$

$\alpha_{2i}$ represents correcting coefficients.

Table 14 shows coefficients or constants in the expressions representing the fourth and fifth surfaces.

TABLE 14

| | Fourth surface | Fifth surface |
|---|---|---|
| $\alpha_2$ | −0.17099751 | −0.038119791 |
| $\alpha_4$ | 0.0 | −0.00068518782 |

In the present example, the first lens 303 is used to determine a width of the line while the second lens 305 is used to generate the line which has a desired brightness distribution along it. Thus, function of the first lens 303 and that of the second lens 305 are clearly separated from each other. Assume that one of the laser diode light sources light emitting conditions of which varies from one to another is used as the laser diode light source 301, for example. In such case, brightness distribution along the line can be kept constant while the focal position is maintained by moving the second lens 305 along the optical axis. On the other hand, when the focal position is adjusted by moving the first lens 303 in the optical direction, brightness distribution along the line remains unchanged.

Figure 25A:
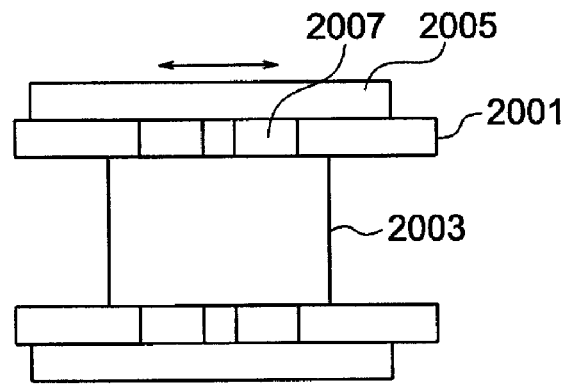
FIGS. 25A and 25B illustrate an example of a mechanism used to move the first lens or the second lens along the optical axis.
Figure 25B:
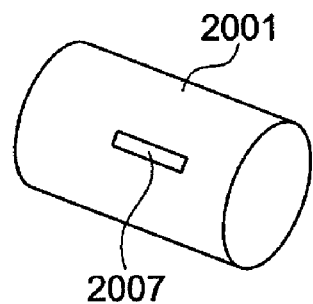

FIGS. 25A and 25B illustrate an example of a mechanism used to move the first lens or the second lens along the optical axis. FIG. 25B shows a perspective view of the moving mechanism. The moving mechanism includes a lens barrel 2001 on the periphery of which a slit 2007 is provided in the longitudinal direction. FIG. 25A shows a cross sectional view of the moving mechanism. The cross section contains the central axis in the longitudinal direction. Inside the lens barrel 2001, a lens holder 2003 is provided such that it can move along the central axis (that is, the optical axis). A handle 2005 is fixed to the lens holder 2003. The handle 2005 is configured such that it can be moved along the slit in the longitudinal direction. Accordingly, the lens holder 2003 can be moved along the optical axis by moving the handle 2005 along the slit 2007.

Figure 26A:
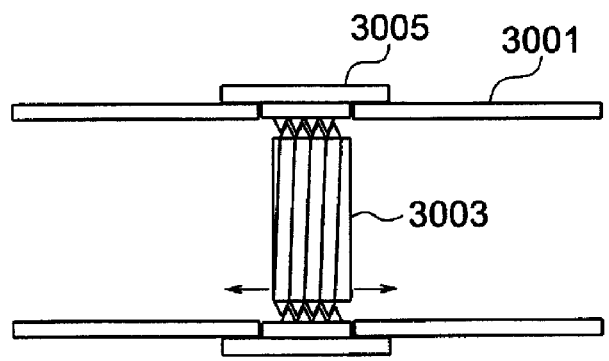
FIGS. 26A and 26B illustrate another example of a mechanism used to move the first lens or the second lens along the optical axis.
Figure 26B:
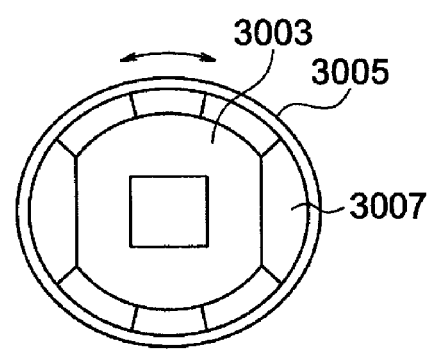
Figure 27:
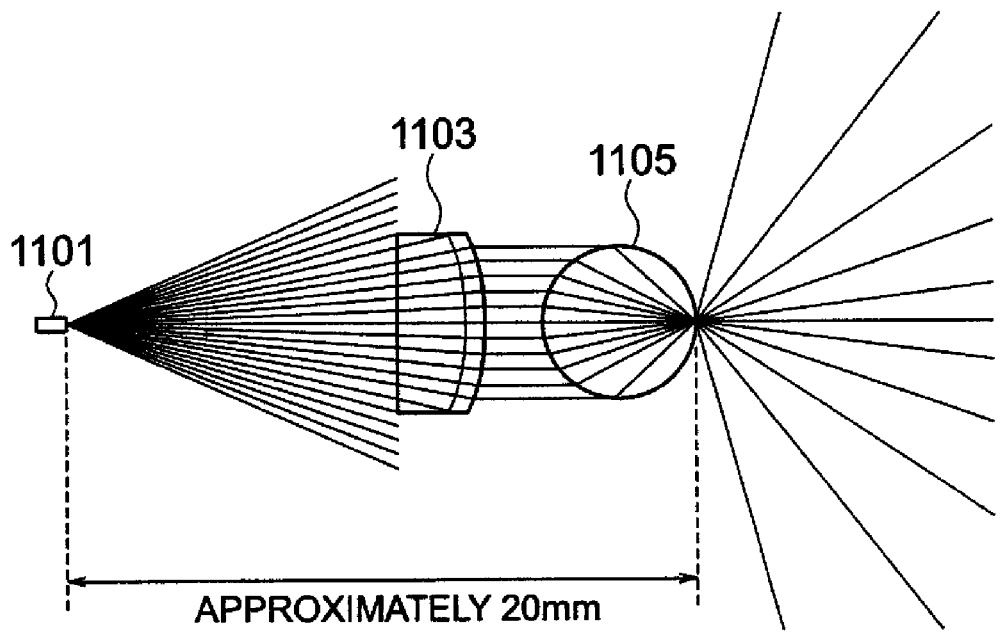
FIG. 27 and FIG. 28 illustrate an example of configurations of conventional line generators.
Figure 28:
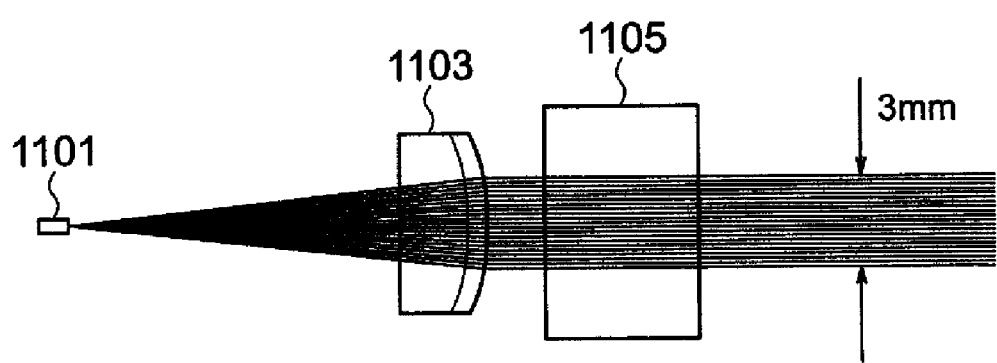
Figure 29:
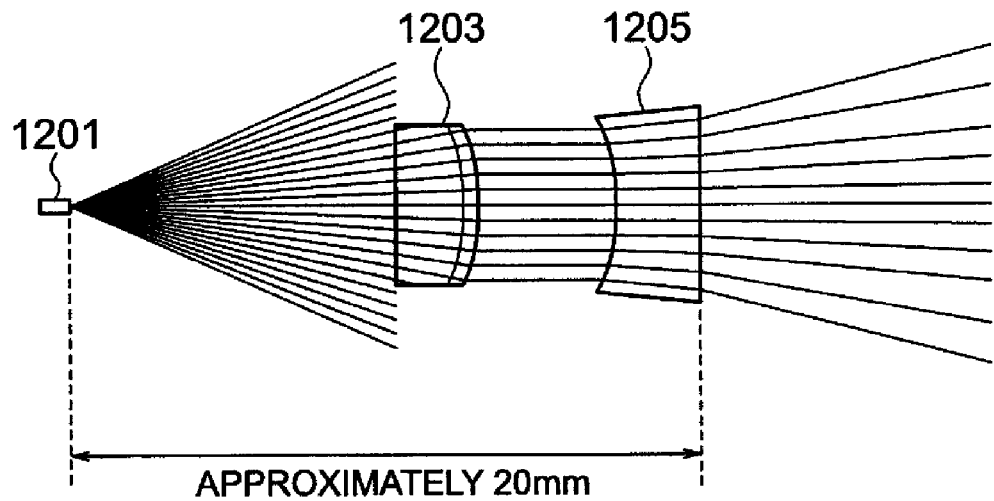
FIG. 29 and FIG. 30 illustrate another example of configurations of conventional line generators.
Figure 30:
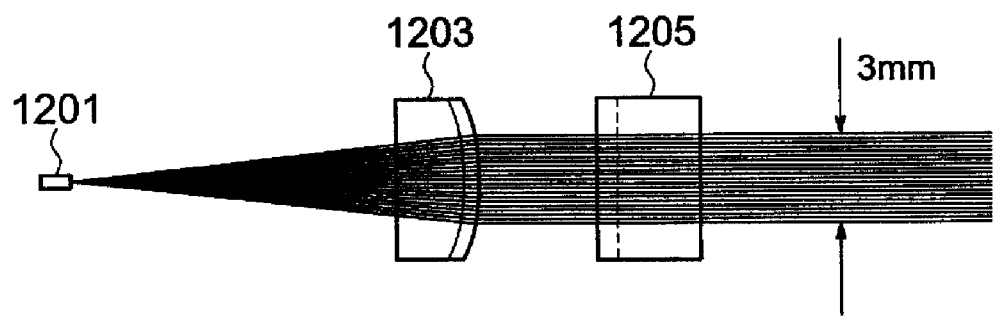

FIGS. 26A and 26B illustrate another example of a mechanism used to move the first lens or the second lens along the optical axis. FIG. 26A shows a cross sectional view of the moving mechanism. The cross section contains the central axis in the longitudinal direction. FIG. 26B shows another cross sectional view of the moving mechanism. The cross section is perpendicular to the central axis in the longitudinal direction. The moving mechanism includes a lens barrel 3001. An annular member 3005 is provided in a portion of the lens barrel 3001. The inside surface of the annular member 3005 is threaded. Inside the lens barrel 3001, a lens holder 3003 is provided. The outside surface of the lens holder 3003 is threaded so as to be engaged with the threaded portion of the inside surface of the annular member 3005. Further, inside the lens barrel 3001, a stopper 3007 is provided such that the lens holder 3003 cannot rotate with respect to the lens barrel 3001. When the annular member 3005 is rotated with respect to the lens barrel 3001, the lens holder 3003 cannot rotate and therefore it moves in the longitudinal direction. Accordingly, the lens holder 3003 can be moved along the optical axis by rotating the annular member 3005.

Figure 10:
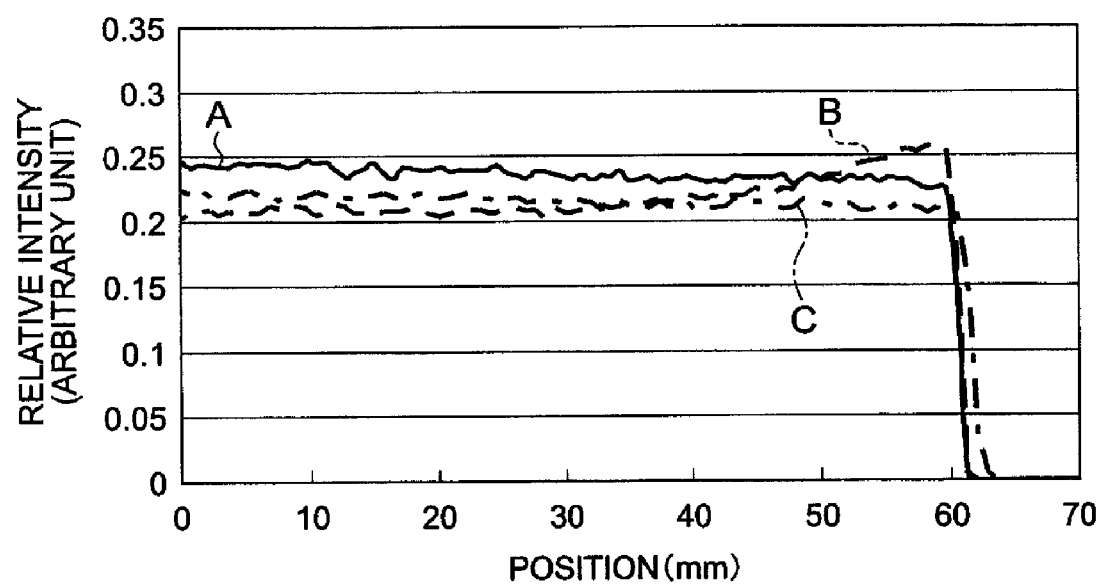
FIG. 10 illustrates function to adjust an interval between the first and second lenses in the line generator according to Example 4 of the present invention.

FIG. 10 illustrates function to adjust an interval between the first and second lenses in the line generator according to Example 4. The horizontal axis of FIG. 10 represents distance between an arbitrary point on the line and the point of the intersection of the line and the optical axis. The vertical axis represents relative intensity of light at the arbitrary point. The illuminated surface is 100 mm away from the light source and perpendicular to the optical axis.

Marked with A in FIG. 10 is intensity distribution of light along the line in the case that the diverging angle of the light source (laser diode) is 30 degrees (a designed value) and an interval between the first lens 303 and the second lens 305 is 3 millimeters. Intensity of light is substantially uniform along the line.

Marked with B in FIG. 10 is intensity distribution of light along the line in the case that the diverging angle of the laser diode has been changed to 35 degrees. Intensity around the point of 60 millimeters is larger by 20% or more than that around the optical axis.

Marked with C in FIG. 10 is intensity distribution of light along the line in the case that the diverging angle of the laser diode is 35 degrees and an interval between the first lens 303 and the second lens 305 has been changed to 3 millimeters. By the adjustment of the interval between the lenses, intensity of light has become substantially uniform along the line.

Thus, according to the present example, even when the diverging angle of the laser diode deviates from the designed value, intensity of light can be maintained substantially uniform along the line by adjusting a position of the second lens 305 along the optical axis.

Figure 11:
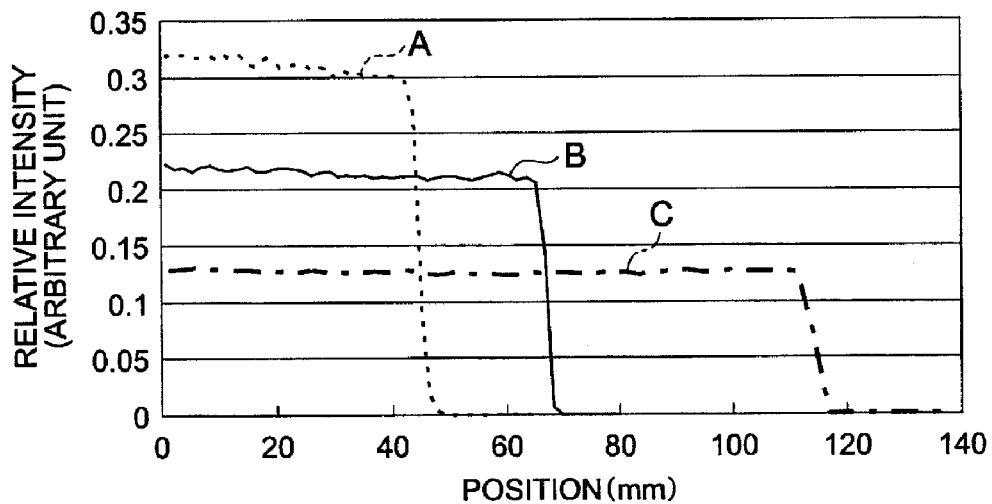
FIG. 11 illustrates function to adjust an interval between the laser diode and the first lens in the line generator according to Example 4 of the present invention.

FIG. 11 illustrates function to adjust an interval between the laser diode and the first lens in the line generator according to Example 4. The horizontal axis of FIG. 11 represents distance between an arbitrary point on the line and the point of the intersection of the line and the optical axis. The vertical axis represents relative intensity of light at the arbitrary point.

Figure 12:
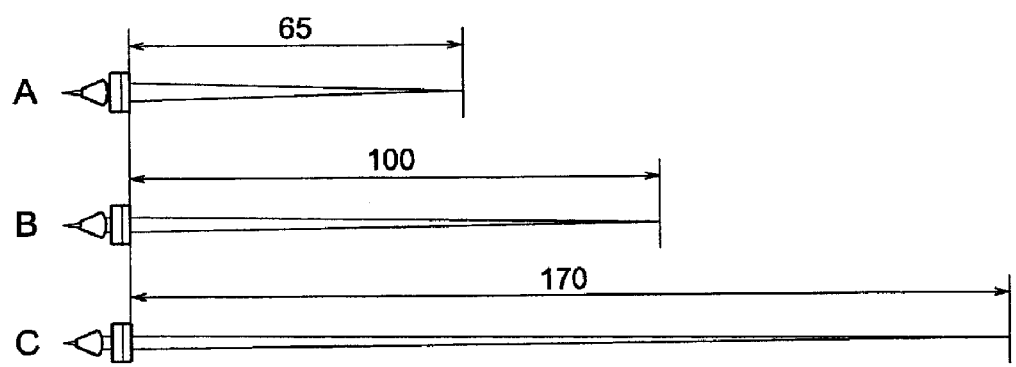
FIG. 12 shows a layout of the line generator and the image plane.

FIG. 12 shows a layout of the line generator and the image plane.

Marked with A in FIG. 11 is intensity distribution of light along the line in the case that an interval between the laser diode and the first lens is 4.0 millimeters. As shown in A of FIG. 12, an interval between the second lens 305 and the image plane is 65 millimeters.

Marked with B in FIG. 11 is intensity distribution of light along the line in the case that an interval between the laser diode and the first lens is 3.0 millimeters. As shown in B of FIG. 12, an interval between the second lens 305 and the image plane is 100 millimeters.

Marked with C in FIG. 11 is intensity distribution of light along the line in the case that an interval between the laser diode and the first lens is 2.5 millimeters. As shown in C of FIG. 12, an interval between the second lens 305 and the image plane is 170 millimeters.

In any of A, B and C in FIG. 11, intensity of light is substantially uniform along the line. Thus, according to the present example, even when a position of the image plane (a position of the focal point) is changed, intensity of light can be maintained substantially uniform along the line by adjusting the interval between the laser diode and the first lens.

Example 5

Figure 13:
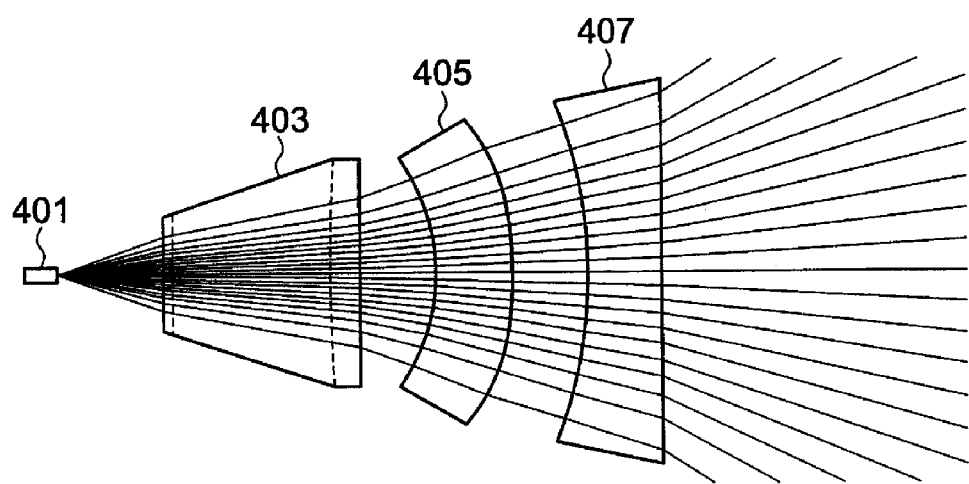
FIG. 13 illustrates a configuration of a line generator according to Example 5 of the present invention.
Figure 14:
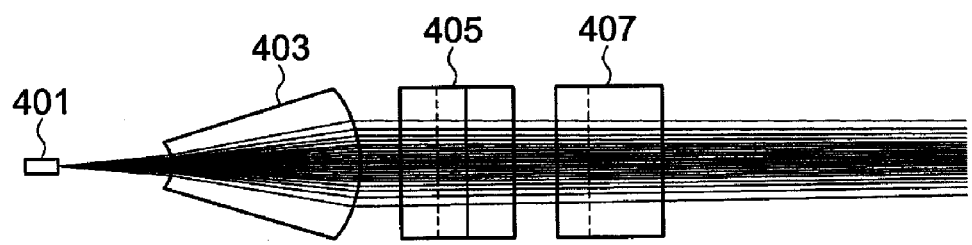
FIG. 14 illustrates a configuration of the line generator according to Example 5 of the present invention.

FIGS. 13 and 14 illustrate the configuration of a line generator according to Example 5 of the present invention. The line generator includes a laser diode light source 401, a first lens 403 which is a cylindrical lens, a second lens 405 which is a cylindrical lens and a third lens 407 which is a cylindrical lens. FIG. 13 shows a cross sectional view in the vertical direction (fast-axis (FA) direction) of the laser diode light source 401 while FIG. 14 shows a cross sectional view in the horizontal direction (slow-axis (SA) direction) of the laser diode light source 401. In FIG. 14, light emitted by the laser diode light source 401 is collimated by the first lens 403 in the SA direction to generate a light beam having a width of 3 millimeters. The width of the light beam after the collimation is that of the line generated by the line generator. Since the first lens 403 is a cylindrical one, the light is not collimated in the FA direction. The light collimated in the SA direction by the first lens 403 is diverged in the FA direction by the second lens 405 and the third lens 407 to generate the line.

Table 15 shows data of the optical system of the line generator according to Example 5.

TABLE 15

| Surface No. | | Refractive index | Abbe constant | Surface interval |
|---|---|---|---|---|
| | Light source | | | 3.0 |
| 2 | First lens (Cylindrical surface) | 1.80086 | 40.80 | 5.0 |
| 3 | First lens (Free form surface) | | | 3.0 |
| 4 | Second lens (Cylindrical surface) | 1.80086 | 40.80 | 2.0 |
| 5 | Second lens (Cylindrical surface) | | | 2.0 |
| 6 | Third surface (Cylindrical surface) | 1.80086 | 40.80 | 2.0 |
| 7 | Third surface (Plane) | | | |

Assuming that the FA direction is the direction of x-axis and the SA direction is the direction of y-axis, the second surface (the surface on the object side of the first lens) is represented by the following expressions.

$$z = \frac{cy^2}{1 + \sqrt{1 - (1+k)c^2 y^2}} \quad (5)$$

$$c = 1/R \quad (2)$$

Table 16 shows coefficients or constants in the expressions representing the second surface.

TABLE 16

| | Second surface |
|---|---|
| R | −0.957 |
| k | 0 |

Assuming that the FA direction is the direction of x-axis and the SA direction is the direction of y-axis, the third surface (the surface on the image side of the first lens) is represented by the following expression. The third surface is a so-called free form surface. In the present example, the free form surface is determined such that it is symmetric with respect to x-axis and y-axis, the lens power in the direction along y-axis is larger than that in the direction along x-axis and lens power in the direction along y-axis around the center differs from that at the periphery.

$$z = \sum_{i,j=0}^{8} A_{ij} x^i y^j \quad (6)$$

Table 17 shows coefficients or constants in the expressions representing the third surface.

TABLE 17

| A02 | −0.17820329 |
| A22 | 0.0021122761 |
| A04 | −0.003687576 |
| A42 | −3.7905744 × 10$^{-5}$ |
| A24 | 0.00018778603 |
| A06 | −0.0001530113 |
| A62 | 9.073778 × 10$^{-7}$ |
| A44 | −1.2914223 × 10$^{-5}$ |
| A26 | 2.627976 × 10$^{-5}$ |
| A08 | −1.1001855 × 10$^{-5}$ |

Assuming that the FA direction is the direction of x-axis and the SA direction is the direction of y-axis, the optical surfaces of the second lens (the fourth surface on the object side and the fifth surface on the image side) are represented by the following expression.

$$z = \sum_{i=2}^{n} \alpha_{2i} x^{2i} \quad (7)$$

$\alpha_{2i}$ represents correcting coefficients.

Table 18 shows coefficients or constants in the expressions representing the fourth and fifth surfaces.

TABLE 18

|  | Fourth surface | Fifth surface |
|---|---|---|
| $\alpha_2$ | −0.105563 | −0.045224 |
| $\alpha_4$ | 0.0 | −1.968589 × 10⁻³ |

Assuming that the FA direction is the direction of x-axis and the SA direction is the direction of y-axis, the optical surfaces of the third lens (the sixth surface on the object side and the seventh surface on the image side) are represented by the following expressions.

$$z = \frac{cx^2}{1 + \sqrt{1 - (1+k)c^2 x^2}} \quad (8)$$

$$c = 1/R \quad (2)$$

k represents a constant for determining a shape of the quadratic curve, c represents a curvature at the center, and R represents a radius of curvature at the center. $\alpha_{2i}$ represents correcting coefficients.

Table 19 shows coefficients or constants in the expressions representing the sixth and seventh surfaces.

TABLE 19

|  | Sixth surface | Seventh surface |
|---|---|---|
| R | −12.149557 | infinity |
| k | 0 | 0 |

Figure 15:
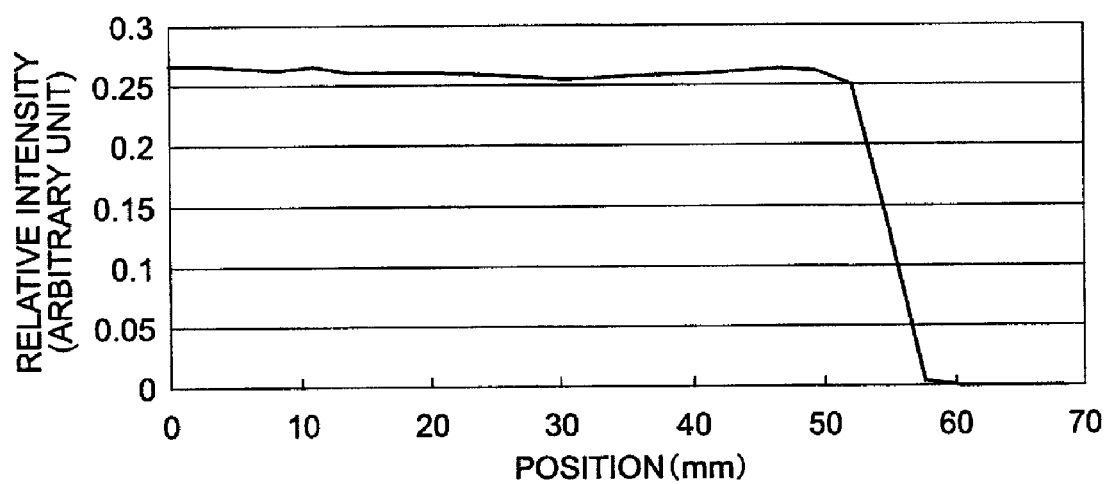
FIG. 15 illustrates performance of the line generator according to Example 5 of the present invention.

FIG. 15 illustrates performance of the line generator according to Example 5. The horizontal axis of FIG. 15 represents distance between an arbitrary point on the line and the point of the intersection of the line and the optical axis. The vertical axis represents relative intensity of light at the arbitrary point. The illuminated surface is 100 mm away from the light source and perpendicular to the optical axis. Brightness along the line is substantially uniform.

In the present example, two lenses (the second lens 405 and the third lens 407) share function to diverge light in the FA direction. In other words, the second lens 405 and the third lens 407 form the second lens group. As a result, individual lenses in the second lens group can be designed and produced more easily.

Example 6

Figure 16:
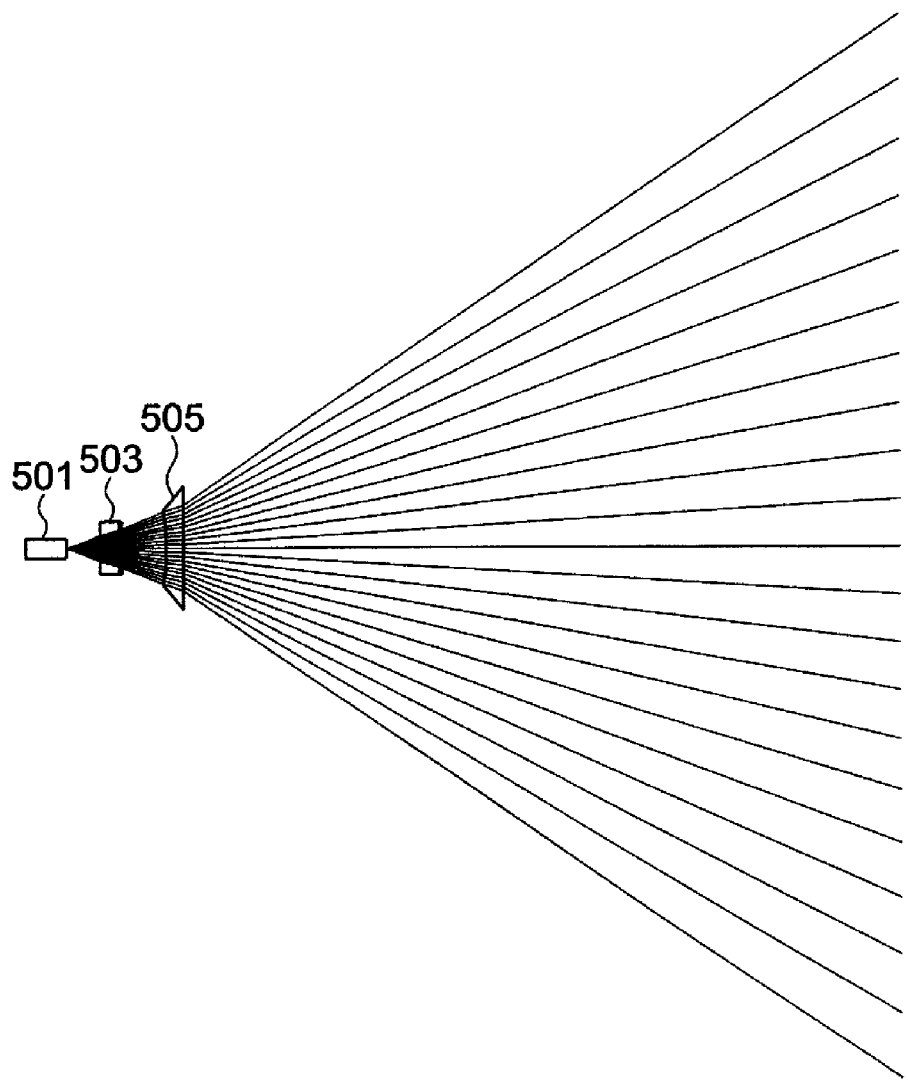
FIG. 16 illustrates a configuration of a line generator according to Example 6 of the present invention.
Figure 17:
FIG. 17 illustrates a configuration of the line generator according to Example 6 of the present invention.

FIGS. 16 and 17 illustrate the configuration of a line generator according to Example 6 of the present invention. The line generator includes a laser diode light source 501, a first lens 503 which is a cylindrical lens and a second lens 505 which has a free from surface as the image side surface (the fifth surface). FIG. 16 shows a cross sectional view in the vertical direction (fast-axis (FA) direction) of the laser diode light source 501 while FIG. 17 shows a cross sectional view in the horizontal direction (slow-axis (SA) direction) of the laser diode light source 501.

In FIG. 17, light emitted by the laser diode light source 501 is collimated by the first lens 503 in the SA direction. Since the first lens 503 is a cylindrical one, the light is not collimated in the FA direction. The light collimated in the SA direction by the first lens 503 is diverged in the FA direction and focused in the SA direction by the second lens 505 to generate the line.

Table 20 shows data of the optical system of the line generator according to Example 6.

TABLE 20

| Surface No. |  | Refractive index | Abbe constant | Surface interval |
|---|---|---|---|---|
|  | Light source |  |  | 3.0 |
| 2 | First lens (Plane) | 1.80086 | 40.80 | 2.0 |
| 3 | First lens (Cylindrical surface) |  |  | 4.0 |
| 4 | Second lens (Cylindrical surface) | 1.80086 | 40.80 | 1.5 |
| 5 | Second lens (Free surface) |  |  | 65 |

Assuming that the FA direction is the direction of x-axis and the SA direction is the direction of y-axis, the second surface (the object side surface of the first lens) and the third surface (the image side surface of the first lens) are represented by the following expressions.

$$z = \frac{cy^2}{1 + \sqrt{1 - (1+k)c^2 y^2}} \quad (5)$$

$$c = 1/R \quad (2)$$

Assuming that the FA direction is the direction of x-axis and the SA direction is the direction of y-axis, the fourth surface (the object side surface of the second lens) is represented by the following expressions.

$$z = \frac{cx^2}{1 + \sqrt{1 - (1+k)c^2 x^2}} \quad (8)$$

$$c = 1/R \quad (2)$$

Table 21 shows coefficients or constants in the expressions representing the second to fourth surfaces.

TABLE 21

|  | Second surface | Third surface | Fourth surface |
|---|---|---|---|
| R | infinity | −3.3882 | −15 |

Assuming that the FA direction is the direction of x-axis and the SA direction is the direction of y-axis, the fifth surface (the image side surface of the second lens) is represented by the following expressions. The fifth surface is a so-called free form surface.

$$z = \sum_{i,j=0}^{8} A_{ij} x^i y^j \qquad (6)$$

Table 22 shows coefficients or constants in the expressions representing the fifth surface.

TABLE 22

| | |
|---|---|
| A02 | −1.451264E−02 |
| A22 | 1.326452E−03 |
| A04 | 1.798895E−03 |
| A42 | −5.888678E−06 |
| A24 | 2.604972E−05 |
| A06 | 8.171482E−05 |
| A62 | 9.123176E−08 |
| A44 | 2.833025E−06 |
| A26 | 3.150682E−05 |
| A08 | 7.367080E−05 |

According to such an embodiment as the present example in which a free form surface is provided in the second lens (group), optimal focusing performance of a line generator which generates a line whose intensity distribution of light is not uniform along the line can be obtained as below. That is, to obtain optimal focusing performance, focusing property of the second lens is changed using the free form surface based on intensity distribution of light along the line while the specification of the first lens (group) is not changed.

Example 7

Figure 18:
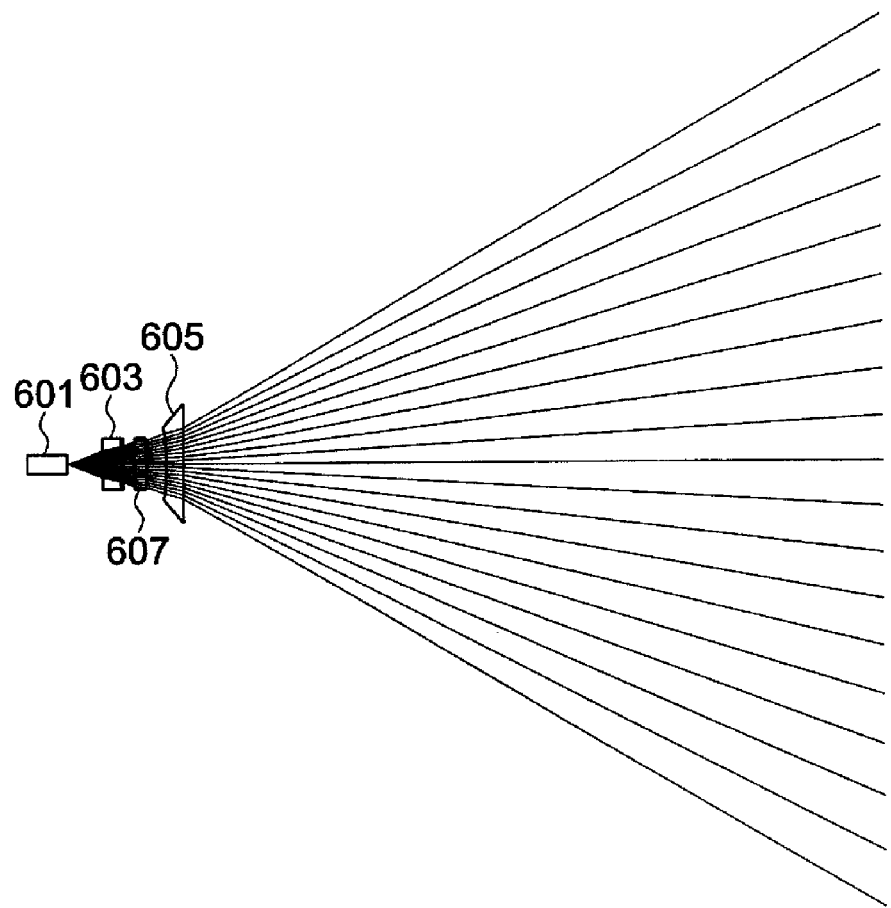
FIG. 18 illustrates a configuration of a line generator according to Example 7 of the present invention.
Figure 19:
FIG. 19 illustrates a configuration of the line generator according to Example 7 of the present invention.

FIGS. 18 and 19 illustrate the configuration of a line generator according to Example 7 of the present invention. The line generator includes a laser diode light source 601, a first lens 603 which is a cylindrical lens and a second lens 605 which is a cylindrical lens. The line generator according to the present example further includes a phase plate 607 which has a free form surface on the object side (the fourth surface) between the first lens 603 and the second lens 605. FIG. 18 shows a cross sectional view in the vertical direction (fast-axis (FA) direction) of the laser diode light source 601 while FIG. 19 shows a cross sectional view in the horizontal direction (slow-axis (SA) direction) of the laser diode light source 601. In FIG. 19, light emitted by the laser diode 601 is collimated by the first lens 603 in the SA direction. Since the first lens 603 is a cylindrical one, the light is not collimated in the FA direction. The light collimated in the SA direction by the first lens 603 is adjusted by the phase plate 607, diverged in the FA direction and focused in the SA direction by the second lens 605 to generate the line.

Table 23 shows data of the optical system of the line generator according to Example 7.

TABLE 23

| Surface No. | | Refractive index | Abbe constant | Surface interval |
|---|---|---|---|---|
| | Light source | | | 3.0 |
| 2 | First lens (Plane) | 1.80086 | 40.80 | 2.0 |
| 3 | First lens (Cylindrical surface) | | | 1.0 |
| 4 | Phase plate (Free form surface) | 1.51680 | 64.167 | 1.0 |
| 5 | Phase plate (Plane) | | | 2.0 |
| 6 | Second lens (Cylindrical surface) | 1.80086 | 40.80 | 1.5 |
| 7 | Second lens (Plane) | | | 65 |

Assuming that the FA direction is the direction of x-axis and the SA direction is the direction of y-axis, the second surface (the object side surface of the first lens) and the third surface (the image side surface of the first lens) are represented by the following expressions.

$$z = \frac{cy^2}{1 + \sqrt{1 - (1+k)c^2 y^2}} \qquad (5)$$

$$c = 1/R \qquad (2)$$

Assuming that the FA direction is the direction of x-axis and the SA direction is the direction of y-axis, the sixth surface (the object side surface of the second lens) and the seventh surface (the image side surface of the second lens) are represented by the following expressions.

$$z = \frac{cx^2}{1 + \sqrt{1 - (1+k)c^2 x^2}} \qquad (8)$$

$$c = 1/R \qquad (2)$$

Table 24 shows coefficients or constants in the expressions representing the second, third, sixth and seventh surfaces.

TABLE 24

| | Second surface | Third surface | Sixth surface | Seventh surface |
|---|---|---|---|---|
| R | infinity | −3.3882 | −15 | infinity |

Assuming that the FA direction is the direction of x-axis and the SA direction is the direction of y-axis, the fourth surface (the image side surface of the phase plate) is represented by the following expressions. The fourth surface is a so-called free form surface.

$$z = \sum_{i,j=0}^{8} A_{ij} x^i y^j \qquad (6)$$

Table 25 shows coefficients or constants in the expressions representing the fourth surface.

TABLE 25

| | |
|---|---|
| A02 | 2.187796E−02 |
| A22 | −6.785688E−03 |
| A04 | −3.012261E−03 |
| A42 | 1.595686E−04 |
| A24 | 7.412937E−05 |
| A06 | −1.617339E−04 |
| A62 | −3.065133E−06 |
| A44 | −2.045186E−05 |

TABLE 25-continued

| | |
|---|---|
| A26 | −3.206443E−05 |
| A08 | −3.290733E−05 |

According to such an embodiment as the present example in which a phase plate is provided, an optical element including a free form surface that is difficult to produce can be produced independently of lenses and therefore the producing process is simplified.

Example 8

Figure 20:
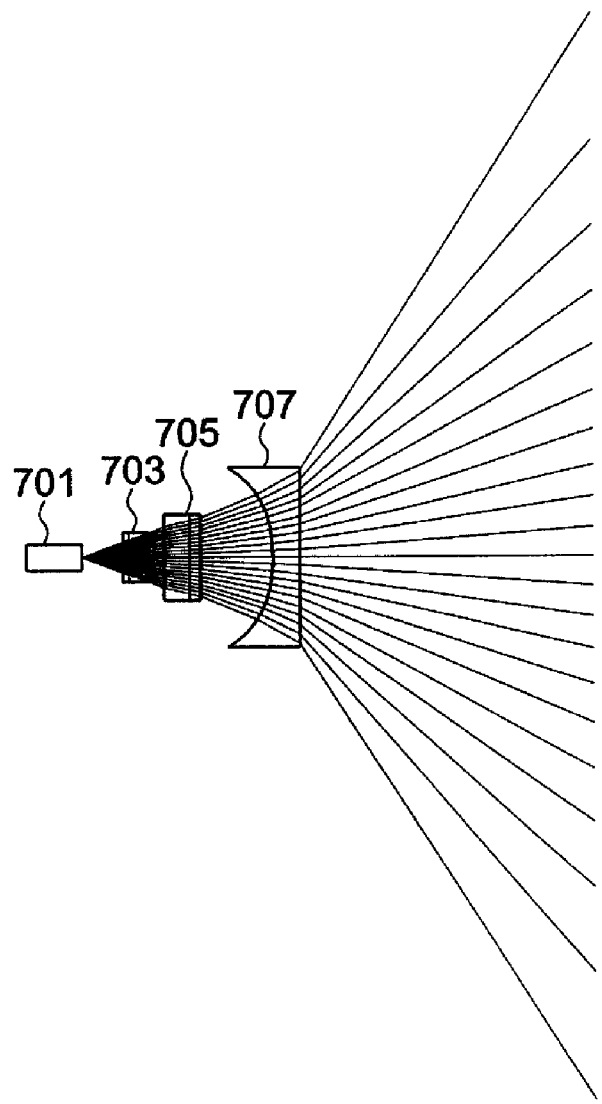
FIG. 20 illustrates a configuration of a line generator according to Example 8 of the present invention.
Figure 21:
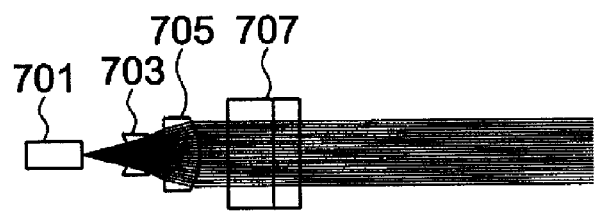
FIG. 21 illustrates a configuration of the line generator according to Example 8 of the present invention.

FIGS. 20 and 21 illustrate the configuration of a line generator according to Example 8 of the present invention. The line generator includes a laser diode light source 701, a first lens 703 which has a free form surface on the image side (the third surface), a second lens 705 which is a cylindrical lens and a third lens 707 which is a cylindrical lens. FIG. 20 shows a cross sectional view in the vertical direction (fast-axis (FA) direction) of the laser diode light source 701 while FIG. 21 shows a cross sectional view in the horizontal direction (slow-axis (SA) direction) of the laser diode light source 701. In FIG. 21, light emitted by the laser diode 701 is collimated in the SA direction by the first lens 703 and the second lens 705. Thus, the first lens 703 and the second lens 705 form a first lens group. The light collimated in the SA direction by the first lens group is diverged in the FA direction by the third lens 707 to generate the line.

Table 26 shows data of the optical system of the line generator according to Example 8.

TABLE 26

| Surface No. | | Refractive index | Abbe constant | Surface interval |
|---|---|---|---|---|
| | Light source | | | 2.5 |
| 2 | First lens (Cylindrical surface) | 1.80086 | 40.8 | 1.0 |
| 3 | First lens (Free form surface) | | | 1.0 |
| 4 | Second lens (Plane) | 1.80086 | 40.8 | 2.0 |
| 5 | Second lens (Cylindrical surface) | | | 2.5 |
| 6 | Third lens (Cylindrical surface) | 1.5176 | 63.5 | 1.0 |
| 7 | Third lens (Cylindrical surface) | | | 5000 |

Assuming that the FA direction is the direction of x-axis and the SA direction is the direction of y-axis, the second surface (the object side surface of the first lens), the fourth surface (the object side surface of the second lens) and the fifth surface (the image side surface of the second lens) are represented by the following expressions.

$$z = \frac{cy^2}{1 + \sqrt{1 - (1+k)c^2y^2}} \quad (5)$$

$$c = 1/R \quad (2)$$

Table 27 shows coefficients or constants in the expressions representing the second, fourth and fifth surfaces.

TABLE 27

| | Second surface | Fourth surface | Fifth surface |
|---|---|---|---|
| R | −2 | infinity | −3.348 |

Assuming that the FA direction is the direction of x-axis and the SA direction is the direction of y-axis, the third surface (the image side surface of the first lens) is represented by the following expression. The third surface is a so-called free form surface.

$$z = \sum_{i,j=0}^{10} A_{ij} x^i y^j \quad (6)$$

Table 28 shows coefficients or constants in the expressions representing the third surface.

TABLE 28

| | |
|---|---|
| A02 | −0.04702 |
| A22 | 0.0344 |
| A04 | 0.027209 |
| A42 | −0.00038 |
| A24 | 0.009589 |
| A06 | 0.004538 |
| A62 | 0.000134 |
| A44 | 6.15E−05 |
| A26 | 0.001836 |
| A08 | 0.000433 |
| A82 | −2.64E−06 |
| A64 | 0.000423 |
| A46 | 0.001679 |
| A28 | 0.002551 |
| A010 | 0.000792 |

Assuming that the FA direction is the direction of x-axis and the SA direction is the direction of y-axis, the sixth surface (the object side surface of the third lens) and the seventh surface (the image side surface of the third lens) are represented by the following expression.

$$z = \sum_{i=4}^{6} A_i x^i \quad (9)$$

Table 29 shows coefficients or constants in the expressions representing the sixth and seventh surfaces.

TABLE 29

| | Sixth surface | Seventh surface |
|---|---|---|
| A4 | −4.00E−03 | 0 |
| A6 | −1.00E−03 | 0 |

Figure 22:
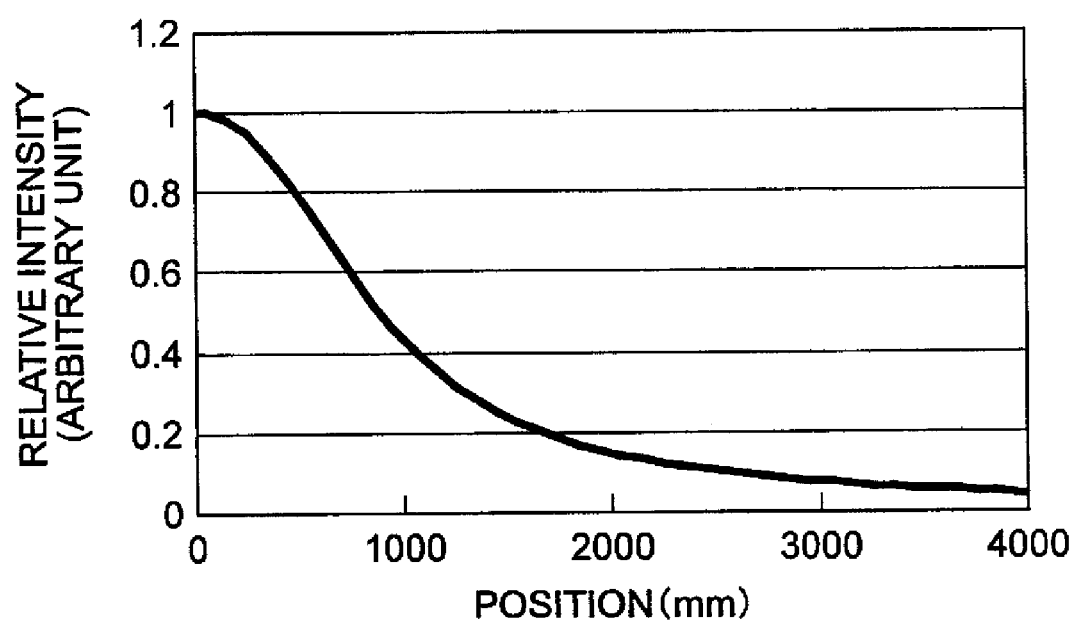
FIG. 22 illustrates intensity of light along the line on the plane located at a position 5 meters away from the light source plane when illuminated by the line generator according to Example 8.

FIG. 22 illustrates intensity of light along the line on the plane located at a position 5 meters away from the light source plane when illuminated by the line generator according to Example 8. The horizontal axis of the graph in FIG. 22 represents distance from an illuminated spot to the intersection point of the illuminated surface and the line connecting the light source and the illuminated surface and perpendicular to the illuminated surface. The vertical axis represents intensity of light in arbitrary unit.

Figure 23:
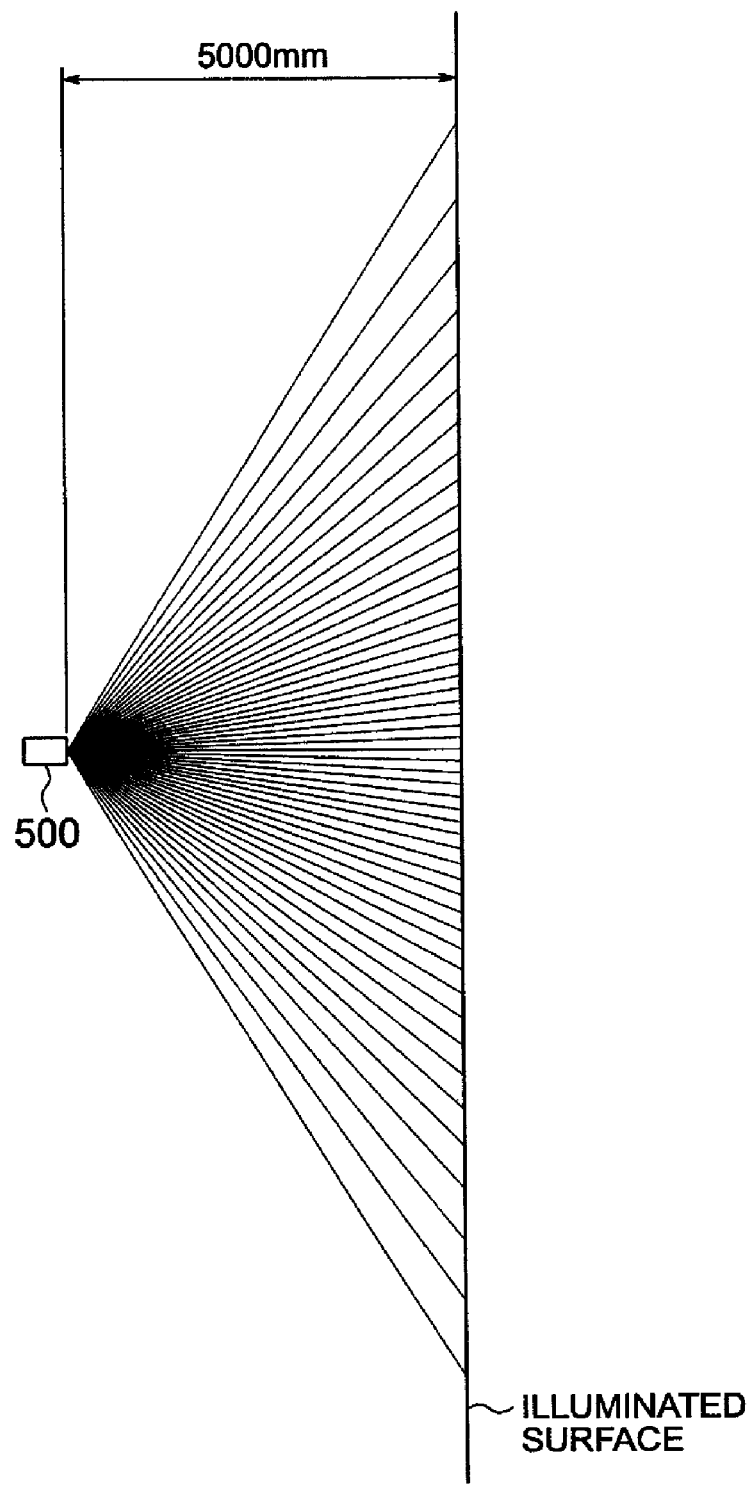
FIG. 23 illustrates a positional relationship between the line generator 500 according to Example 8 and the illuminated surface.

FIG. 23 illustrates a positional relationship between the line generator 500 according to Example 8 and the illuminated surface.

In the line generator according to the present example, focusing performance can be improved by adjusting a shape of the first lens 703 in the first lens group while intensity of light along the line can be controlled by the second lens group (the third lens 707). In the present example, intensity of light is made larger at the center (the intersection point described above) and intensity of light is made to gradually decrease depending on distance from the center to obtain a certain length of line.

Advantages of a free form surface will be described below in general.

Figure 24:
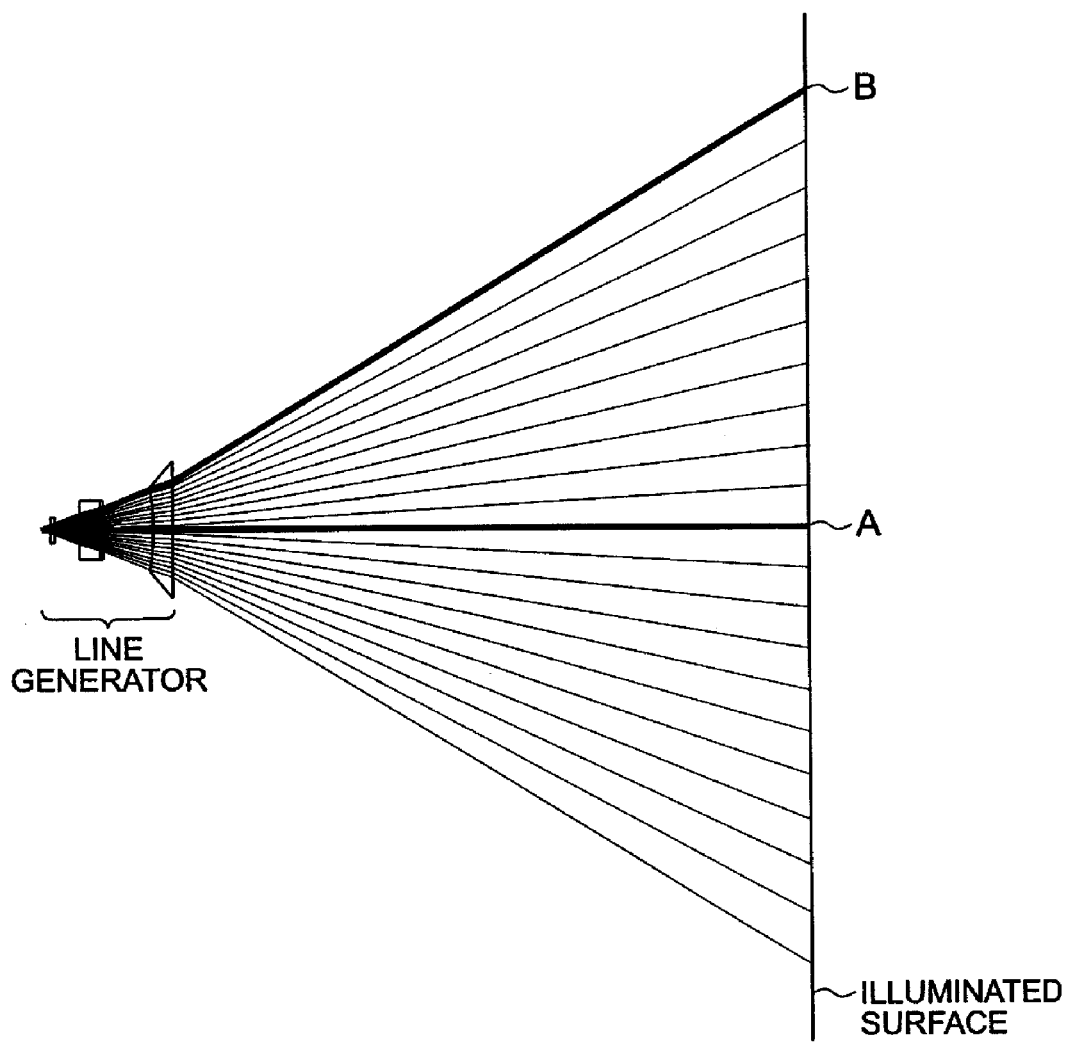
FIG. 24 illustrates a positional relationship between the line generator and the illuminated surface in general.

FIG. 24 illustrates a positional relationship between the line generator and the illuminated surface in general. In FIG. 24 point A indicates the intersection point of the illuminated surface and the line connecting the light source and the illuminated surface and perpendicular to the illuminated surface. Point B indicates a point on the line away form the point A. An optical path length from the light source to the point A is smaller than that form the light source to the point B. Thus, an optical path length from the light source to a point on the line on the illuminated surface will vary depending on diverging angle of light from the light source. Accordingly, it is difficult to collimate or to focus light for the whole length of the line with high accuracy. Under the situation described above, when a free form surface is used to adjust the focal position, light can be focused with higher accuracy at any point on the line on the illuminated surface which is a plane or a curved surface.

In the examples described above, laser diodes are used as the light source. Light emitting diodes or light transmitted through optical fibers are also used as the light source.

We claim:

1. A line generator comprising:
a light source;
a first lens group; and
a second lens group,
wherein an optical axis is set to a path of a light beam which travels orthogonal to incidence surfaces of both the first and second lens groups, and
wherein the first lens group is configured such that light beams from the light source are collimated or focused only in a first direction without being collimated in a second direction in a plane orthogonal to the optical axis and the second lens group which has a negative power and a surface concave to the first lens group side is configured such that the light beams which have passed through the first lens group form a line which extends in the second direction and has a width in the first direction.

2. A line generator according to claim 1, which is configured such that a position of the image plane of the line can be adjusted while intensity distribution of light along the line is maintained, by adjusting a position of the first lens group along the optical axis.

3. A line generator according to claim 1, which is configured such that intensity distribution of light along the line can be adjusted by adjusting a position of the second lens group along the optical axis.

4. A line generator according to claim 1, wherein the light source is a laser diode and the first direction is set to the vertical direction (first-axis direction) of the laser diode and the second direction is set to the horizontal direction (slow-axis direction) of the laser diode.

5. A line generator according to claim 1, wherein the light source is a laser diode and the second direction is set to the vertical direction (first-axis direction) of the laser diode and the first direction is set to the horizontal direction (slow-axis direction) of the laser diode.

6. A line generator according to claim 1, wherein at least one surface of the first and second lens groups is a free form surface which is symmetric with respect to the first direction and the second direction and a focal length in the first direction around the center differs from a focal length in the first direction at the periphery.

7. A line generator according to claim 1, further comprising a phase plate having at least one free form surface.

* * * * *